United States Patent [19]

Muzyk

[11] Patent Number: 5,190,121

[45] Date of Patent: Mar. 2, 1993

[54] TWO PHASE COMPRESSOR LUBRICATION

[75] Inventor: Gregory L. Muzyk, Sterling Heights, Mich.

[73] Assignee: General Motors Corporation, Detroit, Mich.

[21] Appl. No.: 786,312

[22] Filed: Oct. 31, 1991

[51] Int. Cl.$^5$ .............................................. F01M 1/04
[52] U.S. Cl. ................................. 184/6.5; 184/6.26; 184/13.1; 123/196 R
[58] Field of Search ..................... 184/6.5, 6.16, 6.26, 184/106, 55.1, 11.1, 13.1, 6.13; 123/196 R, 195 C

[56] References Cited

U.S. PATENT DOCUMENTS

| | | | |
|---|---|---|---|
| 904,132 | 11/1908 | Johnston | 184/6.5 |
| 1,293,266 | 2/1919 | Warren | 184/106 |
| 1,713,872 | 5/1929 | Hunt | 184/6.5 |
| 1,731,601 | 10/1929 | Turney | 123/196 R |
| 1,920,012 | 7/1933 | Good | 123/196 R |
| 4,270,497 | 6/1981 | Valerio | 184/6.5 |
| 4,524,735 | 6/1985 | Bauder | 123/196 R |
| 4,721,077 | 1/1988 | Fukuo et al. | 184/6.5 |
| 4,909,203 | 3/1990 | Fukuo | 184/6.5 |
| 4,970,996 | 11/1990 | Matsuo et al. | 123/196 R |

FOREIGN PATENT DOCUMENTS 0025171 of 1906 United Kingdom ................. 184/6.5

Primary Examiner—Ira S. Lazarus
Assistant Examiner—Alan B. Cariaso
Attorney, Agent, or Firm—Robert J. Outland

[57] ABSTRACT

An auxiliary air compressor for automotive application, as in a two-stroke engine, has a two phase oiling system combining mist lubrication of the crankcase with a splash pocket below the crankshaft. The pocket collects oil during shutdowns that is splashed by the rotating crank components to lubricate the compressor at startup until the mist system is fully effective.

6 Claims, 1 Drawing Sheet

TWO PHASE COMPRESSOR LUBRICATION

TECHNICAL FIELD

This invention relates to reciprocating air compressors and particularly to lubrication systems for oil delivery in small compressors for auxiliary automotive use.

BACKGROUND

It is known in the art relating to small air compressors to use either of two different forms of crankcase and cylinder lubrication, oil mist and splash.

Oil misting is accomplished by injecting a metered amount of oil, such as through a one way check valve, into the compressor's crankcase. The turbulence in the crankcase caused by the spinning crankshaft and reciprocating piston breaks up the oil droplets, creating a fine mist. As the oil mist accumulates in the crankcase, the excess oil drops down to the sump or oil pan and is returned to an external reservoir through another check valve connected with the sump. The compressor crankcase has positive and negative pressure pulsations caused by the piston movement which pull in and push out oil through the two check valves.

A draw back of the oil mist oiling system is that when the compressor is shut down for several hours or days, all of the oil in the crankcase will drain out. Then, when the compressor is restarted, it may run for several cycles without adequate lubrication because of insufficient oil mist. Also, if the oil supply is cut off during operation, the compressor may soon fail from lack of lubrication. Advantages of the mist system are low oil consumption and avoidance of a need to maintain a particular crankcase oil level.

The splash system uses a crankcase with a sump or oil pan filled with oil and a dipper attached to or forming part of the connecting rod or crankshaft. As the crank rotates, the dipper picks up oil from the sump and splashes it over the inside of the crankcase, lubricating the bearings and piston of the compressor. This provides excellent lubrication. However, the system generally results in higher oil consumption than the mist system and requires that the oil level be regularly checked to see that it is properly maintained.

SUMMARY OF THE INVENTION

The present invention provides some of the advantages of both the mist and splash systems through use of a crankcase splash tray in conjunction with an oil mist system to form a two phase oil lubrication system.

The system includes an oil mist supply to the engine crankcase together with a shallow sump or collector pocket in the bottom of the crankcase. The pocket may be formed by an insert in the crankcase or in any other suitable fashion such as forming integral with the crankcase bottom. The pocket preferably has a convex surface facing upward in close proximity with the arc of travel of the crankshaft counterweights and/or crank throw-connecting rod.

The pocket collects a substantial amount of oil that drains from the compressor components and crankcase walls when not in use. Upon starting, the collected oil is picked up and thrown or splashed by the crankshaft and/or connecting rod onto the cylinder and other surfaces to lubricate them until the misting system reaches full effectiveness. Excess oil from the pocket is drained from the top of the oil pocket through an overflow connecting with the spill port and return check valve used in the oil mist recirculation system.

With this two phase system, the advantages of the oil mist system are preserved, including low oil consumption and avoidance of a need to monitor the oil level in the crankcase. In addition, startup splash lubrication is provided during the period when the oil mist system is becoming fully effective after starting.

These and other features and advantages of the invention will be more fully understood from the following description of certain specific embodiments of the invention taken together with the accompanying drawings.

BRIEF DRAWING DESCRIPTION

DETAILED DESCRIPTION

Figures 1, 2, 3:
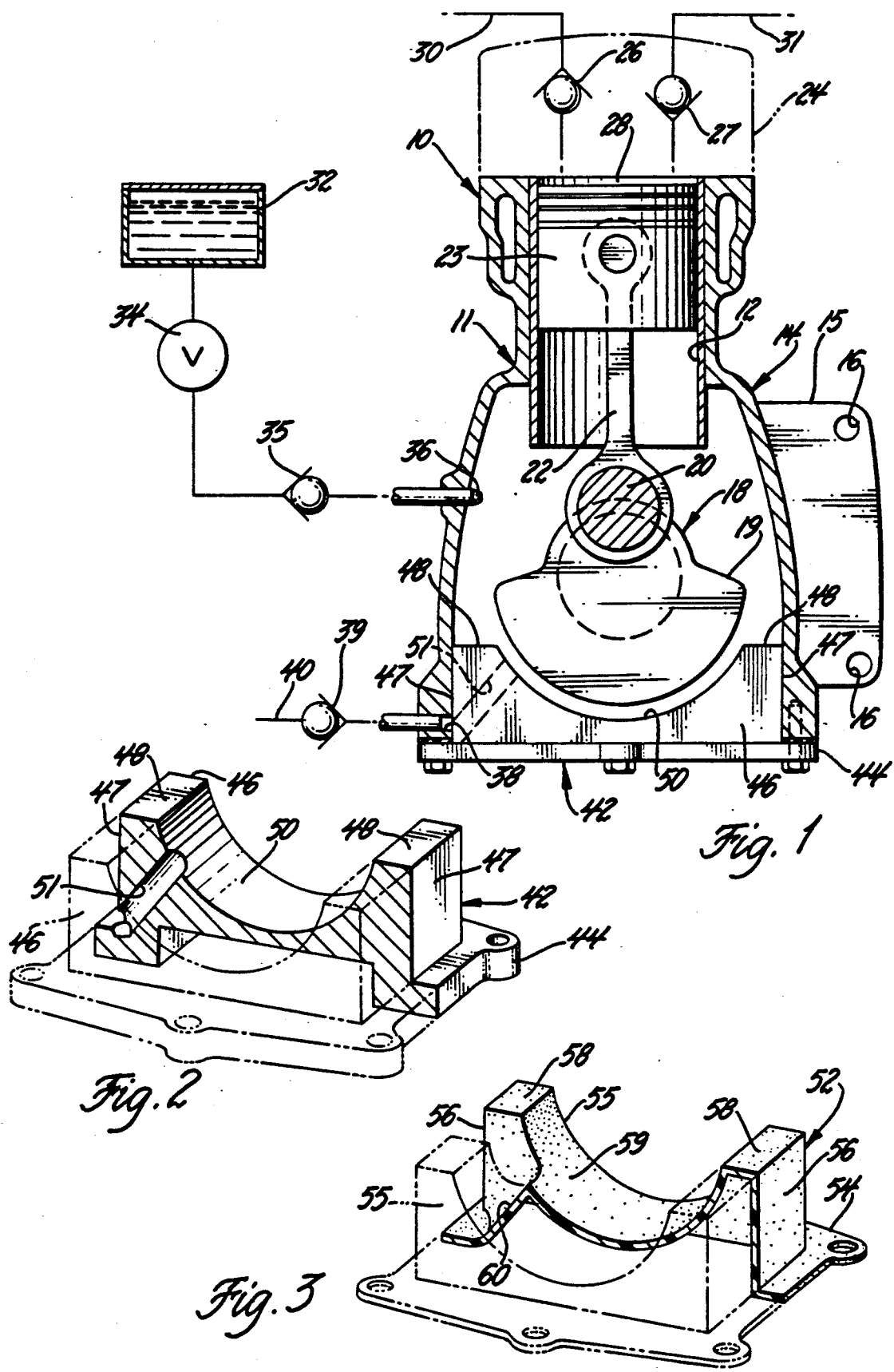
FIG. 1 is a cross-sectional view of a reciprocating piston air compressor having a two phase lubrication system according to the invention.
FIG. 2 is a pictorial view in cross section of a pocket defining machined insert for use in the compressor of FIG. 1.
FIG. 3 is a view similar to FIG. 2 but showing an alternative embodiment of formed bottom plate defining a pocket in accordance with the invention.

Referring now to FIGS. 1 and 2 of the drawings in detail, numeral 10 generally indicates a reciprocating piston compressor of a type usable, for example, for supplying pressurized air to the fuel injection system of a two stroke spark ignition engine.

Compressor 10 has a cylinder block assembly 11 including a cylinder 12 and crankcase 14. On the outside of the crankcase are a pair of mounting brackets 15 having holes 16 for mounting the compressor on an associated engine or other suitable component.

Within the crankcase 14 is carried a rotatable crankshaft 18 having counterweights 19 and a throw with a crankpin 20 carrying a connecting rod 22. The rod 22 connects the crank throw with a piston 23 that reciprocates in the cylinder 12 upon rotation of the crankshaft.

The outer end of the cylinder is closed by a cylinder head 24 having an inlet valve 26 and an outlet valve 27, both one-way valves shown schematically, which are normally of the reed type. The valves 26, 27 connect a working chamber 28 between the head and piston with an inlet air source 30 and outlet means 31, respectively.

The crankcase is equipped with a two phase lubrication system according to the invention. This includes an oil mist supply including, for example, an air pressurized oil container 32, a metering valve 34, a check valve 35 and a spray nozzle 36 in the upper portion for delivering oil mist into the crankcase. Any other suitable oil mist delivery could be used if desired. Near the bottom of the crankcase is a drain port 38 connected through an outward flow check valve 39 with lubricant return means 40.

The open bottom of the crankcase is closed by a pocket insert 42 which may be cast, machined from solid stock, molded from a plastic or metal sheet or formed in any other suitable fashion. FIG. 2 illustrates a machined insert 42. Of the insert 42 is formed as a plate, it may be supported by a separate cover for the crankcase bottom but the insert 42 may, as shown, also act as the cover if desired.

As may be best seen in FIG. 2, the formed pocket insert 42 includes a mounting flange 44 connecting with upstanding vertical walls including two sides 46 and two ends 47. The ends rise to upper edges 48 which are connected by a part-cylindrical pocket 50. The pocket has an upward facing surface, preferably having a radius approximating that of the envelope traversed by the motion of the outer portions of the crankshaft counterweights and/or the connecting rod, at least one of which the pocket 50 closely opposes as installed. An overflow passage 51 extends through one of the ends 47 from a nearby portion of the pocket 50 to the drain port 38 forming a weir that drains the pocket only to a predetermined level.

FIG. 3 illustrates an alternative embodiment of pocket insert 52. The insert is hollow as it is formed from a sheet of plastic or metal. However, it also includes a mounting flange 54 with vertical sides 55 and ends 56 that fit closely into the compressor crankcase 14 as in the first embodiment. Upper edges 58 are again connected by a part-cylindrical pocket 59. A channel 60 extends through one edge 58 between the end 56 and an upper portion of the pocket 59 to form an overflow weir as before.

In operation of both of the illustrated embodiments, rotation of the crankshaft compresses air drawn into chamber 28 through valve 26 and forces it out through valve 27 for use as desired. Lubricating oil is supplied to the cylinder and moving parts of the compressor through the the oil mist system, including the oil container 32, metering valve 34, check valve 35 and nozzle 36. The container may be pressurized by air output from the compressor if desired with the flow being metered by the valve 34. Excess oil reaching the bottom of the crankcase is drained through the port 38 and valve 39 to return means which can recirculate the oil to the container 32, if desired, through means not shown.

When the compressor is stopped, mist oil settles on the walls of the crankcase and associated components and runs downward to the pocket insert 42 or 52. The draining oil first fills up the pocket 50 or 59 and any excess runs down the passage 51 or channels 60 to the drain port 38 for recirculation. Upon starting of the compressor, the counterweights 19 and/or connecting rod 22 splash the collected oil in the pocket 50, 59 onto the cylinder and other components to lubricate these parts at least until the oil mist system is fully effective.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. Two phase oil lubrication means for a reciprocating piston machine having a crankcase, a cylinder and associated mechanism rotatable within a closely surrounding imaginary envelope within the crankcase, said lubrication means comprising a mist system arranged to supply oil mist to the crankcase for lubricating the mechanism when in operation, a splash pocket formed by a recess in a bottom wall of the crankcase for collecting oil between operating periods, the pocket having a surface below and conforming approximately with a lower portion of such envelope of the rotatable mechanism such that the mechanism splashes collected oil from the splash pocket during operation, and a drain system communicating with an upper portion of the splash pocket for draining excess oil from the bottom of the crankcase.

2. A compressor including a crankcase carrying a crankshaft, a cylinder having a piston reciprocable in the cylinder and connected with the crankshaft, the crankshaft and connected components defining mechanism rotatable within a closely surrounding imaginary envelope within the crankcase, and two phase oil lubrication means comprising a mist system arranged to supply oil mist to the crankcase for lubricating the compressor when in operation, a splash pocket formed by a recess in a bottom wall of the crankcase for collecting oil between operating periods, the pocket having a surface below and conforming approximately with a lower portion of the envelope of the rotatable mechanism such that the mechanism splashes collected oil from the splash pocket during operation, and a drain system communicating with an upper portion of the splash pocket for draining excess oil from the bottom of the crankcase.

3. The invention of claim 2 wherein said bottom wall is defined, at least in part, by a formed insert having a mounting flange connected with upstanding walls connecting with said pocket, the pocket having a part cylindrical configuration with a radius approximating the lower portion of the envelope traversed by rotating outer portions of the crankshaft and connected components.

4. The invention of claim 1 wherein said bottom wall is defined, at least in part, by a formed insert having a mounting flange connected with upstanding walls connecting with said pocket, the pocket having a part cylindrical configuration with a radius approximating the lower portion of the envelope traversed by rotating outer portions of the rotatable mechanism.

5. The invention of claim 1 wherein said drain system includes a drain port near the bottom of the crankcase and the lubrication system further comprises means for conveying excess oil from the upper portion of the splash pocket to the drain port.

6. The invention of claim 2 wherein said drain system includes a drain port near the bottom of the crankcase and the lubrication system further comprises means for conveying excess oil from the upper portion of the splash pocket to the drain port.

* * * * *